(12) United States Patent
Funken et al.

(10) Patent No.: US 10,591,377 B2
(45) Date of Patent: Mar. 17, 2020

(54) PRESSURE TRANSFER MODULE AND PRESSURE MEASURING TRANSDUCER HAVING A PRESSURE TRANSFER MODULE

(71) Applicant: Endress + Hauser GmbH + Co. KG, Maulburg (DE)

(72) Inventors: Dieter Funken, Lorrach (DE); Igor Getman, Lorrach (DE); Sergej Lopatin, Lorrach (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 121 days.

(21) Appl. No.: 15/735,641

(22) PCT Filed: May 31, 2016

(86) PCT No.: PCT/EP2016/062219
§ 371 (c)(1),
(2) Date: Dec. 12, 2017

(87) PCT Pub. No.: WO2016/206923
PCT Pub. Date: Dec. 29, 2016

(65) Prior Publication Data
US 2018/0299340 A1    Oct. 18, 2018

(30) Foreign Application Priority Data
Jun. 26, 2015 (DE) .......................... 10 2015 110 351

(51) Int. Cl.
*G01L 19/00* (2006.01)
*G01L 19/06* (2006.01)

(52) U.S. Cl.
CPC ...... *G01L 19/0046* (2013.01); *G01L 19/0681* (2013.01)

(58) Field of Classification Search
CPC ............ G01L 19/0046; G01L 19/0645; G01L 9/0072; G01L 19/0007; G01L 27/007;
(Continued)

(56) References Cited

U.S. PATENT DOCUMENTS

| 6,050,145 A * | 4/2000 | Olson ................ G01L 19/0084 73/706 |
| 8,210,048 B2 * | 7/2012 | Funken ............... G01L 19/0046 73/706 |

(Continued)

FOREIGN PATENT DOCUMENTS

| CN | 1012 63374 A | 9/2008 |
| CN | 10 2099604 A | 6/2011 |

(Continued)

OTHER PUBLICATIONS

6erman Search Report, German PTO, Munich, dated Oct. 8, 2015.
(Continued)

*Primary Examiner* — Andre J Allen
(74) *Attorney, Agent, or Firm* — Bacon & Thomas, PLLC (57) ABSTRACT

A pressure transfer module for transfer of pressures less equals 100 mbar, and suitable for high temperature applications, comprising an isolating diaphragm outwardly sealing a first pressure chamber; a transfer diaphragm outwardly sealing a second pressure chamber; and a pressure transfer path connecting the first pressure chamber with the second pressure chamber. The first and the second pressure chambers and the pressure transfer path are filled with a pressure transfer liquid, via which a pressure acting externally on the isolating diaphragm is transmitted to the transfer diaphragm. The pressure transfer liquid is under a pre-pressure, especially a pre-pressure of greater than or equal to 30 mbar, especially greater than or equal to 50 mbar. The isolating diaphragm and the transfer diaphragm under the pre-pressure assume a starting position, from which they are (Continued)

deflected by the pressure to be transmitted, and the starting positions of isolating diaphragm and transfer diaphragm lie as a function of size of the pre-pressure and size of the pressure to be transmitted within deflection ranges of the diaphragms, in which deflections from their starting positions have due to their formation a non-axisymmetric part, especially an antisymmetric part.

19 Claims, 2 Drawing Sheets

(58) Field of Classification Search
CPC ... G01L 19/04; G01L 13/026; G01L 19/0084;
G01L 19/0618; G01L 19/14; G01L
19/0663; G01L 9/125; G01L 13/025;
G01L 15/00; G01L 19/003; G01L
19/0636; G01L 19/143; G01L 19/147;
G01L 9/007; G01L 19/0092; G01L
19/0672; G01L 19/0681; G01L 7/082;
G01L 9/0075; G01L 19/0061; G01L
19/02; G01L 19/06; G01L 19/0654; G01L
19/144; G01L 19/146; G01L 1/00; G01L
27/005; G01L 7/08; G01L 9/0026; G01L
9/0027; G01L 9/0041; G01L 9/0064;
G01L 9/065; G01L 9/12; G01L 19/0609;
G01L 19/0627; G01L 19/148; G01L
2009/0067
See application file for complete search history.

(56) References Cited

U.S. PATENT DOCUMENTS

2004/0154404 A1* 8/2004 Parravicini ......... G01L 19/0007
73/756

2007/0000332 A1* 1/2007 Boehler ............ G01L 19/0046
73/708
2011/0113889 A1* 5/2011 Funken .................. F16J 3/02
73/715
2012/0125112 A1* 5/2012 Volonterio ........... G01L 9/0026
73/715
2012/0125193 A1* 5/2012 Philipps ............ G01L 19/0046
92/5 R
2012/0197553 A1* 8/2012 Volonterio ........... G01L 27/007
702/50
2014/0090476 A1 4/2014 Miller et al.
2017/0089793 A1* 3/2017 Fetisov ................ G01L 9/0064

FOREIGN PATENT DOCUMENTS

| CN | 103712733 A | 4/2014 |
| DE | 10 2004 006 383 A1 | 8/2005 |
| DE | 10 2004 052 950 A1 | 5/2006 |
| DE | 10 2005 027 035 A1 | 12/2006 |
| DE | 10 2006 049 942 A1 | 4/2008 |
| DE | 10 2007 056 844 A1 | 6/2009 |
| DE | 10 2008 019 054 A1 | 11/2009 |
| DE | 10 2008 033 337 A1 | 1/2010 |
| DE | 10 2010 042 421 A1 | 4/2012 |
| DE | 10 2011 119 588 A1 | 5/2013 |
| EP | 2 097 727 B1 | 9/2009 |
| WO | 2005/075952 A1 | 8/2005 |

OTHER PUBLICATIONS

International Search Report, EPO, The Netherlands, dated Sep. 8, 2016.
Office Action dated May 28, 2019 issued in corresponding Chinese application No. 201680036422.1.

* cited by examiner

PRESSURE TRANSFER MODULE AND PRESSURE MEASURING TRANSDUCER HAVING A PRESSURE TRANSFER MODULE

TECHNICAL FIELD

The present invention relates to a pressure transfer module for transfer of pressures, comprising an isolating diaphragm outwardly sealing a first pressure chamber and contactable externally with a pressure to be transmitted, a transfer diaphragm outwardly sealing a second pressure chamber, and a pressure transfer path connecting the first pressure chamber with the second pressure chamber, wherein the first and the second pressure chambers and the pressure transfer path are filled with a pressure transfer liquid, via which a pressure acting externally on the isolating diaphragm is transmitted to the transfer diaphragm. The present invention relates as well to a pressure measuring transducer equipped with the pressure transfer module.

BACKGROUND DISCUSSION

In industrial pressure measuring technology, pressure transfer means filled with a pressure transfer liquid are used for hydraulic transfer of pressures. These comprise regularly an isolating diaphragm outwardly sealing a pressure chamber and contactable externally with a pressure to be transmitted, and a pressure transfer path connecting the pressure chamber with a targeted location.

Pressure transfer means are applied in pressure measuring technology, e.g. in pressure measuring transducers, which comprise, arranged in a pressure measuring, chamber, a pressure sensor, which is supplied via the pressure transfer path with the pressure acting on the isolating diaphragm. In such case, these pressure transfer means serve for protecting the pressure sensor against direct contact with a medium, whose pressure is to be measured. Moreover, they serve for protecting the pressure sensor and electronic components connected therewith against high temperatures acting, in given cases, on the isolating diaphragm, temperatures which such components cannot regularly withstand.

Isolating diaphragms are, as a rule, circular or have a wave profile with waves arranged concentrically with the center of the diaphragm. These isolating diaphragms have a stiffness rising strongly non-linearly with increasing deflection of the isolating diaphragm from its middle position. The stiffer an isolating diaphragm is, the more strongly it corrupts a pressure to be transmitted through it.

For solving this problem, German Patent, DE 10 2005 023 021 A1 describes pressure transfer means with an isolating diaphragm formed as a wave diaphragm. Such isolating diaphragms have at least two different energetically favorable and therewith stable, rest positions. These pressures transfer means are filled with a predetermined amount of pressure transfer liquid, which is sized in such a manner that the isolating diaphragm is located during operation in a working position located between two neighboring rest positions. The means, however, that the isolating diaphragm is bistable and even small deflections of the isolating diaphragm lead to its wanting to go to the neighboring rest position.

There are applications, in which isolating diaphragms of pressure transfer means are exposed to high temperatures, especially temperatures above 200° C. At such temperatures, the pressure transfer liquid in the hydraulic path can evaporate or outgas. Especially problematic, in such case, are situations, in which a small pressure, especially an absolute pressure of less than 100 mbar, is to be transmitted via the isolating diaphragm. The evaporation occurs in the most favorable case reversibly according to the vapor pressure curve for the particular pressure transfer liquid. This can lead, especially in the case of small pressure to be transmitted, to considerable pressure measurement errors, and, in the worst case, even to a plastic deformation of the isolating diaphragm. Moreover, there is the danger that irreversible processes occur, in the case of which due to reactions with impurities or with the hydraulic path bounding surfaces, decomposition products form, which, after the outgassing, no longer return into solution.

For solving this problem, German Patent, DE 10 2004 052 950 A1 describes a pressure measuring transducer, which has a sensor module and a pressure transfer module placed in front of the sensor module.

The pressure transfer module includes
an isolating diaphragm outwardly sealing a first pressure chamber and externally contactable with a pressure to be transmitted,
a transfer diaphragm outwardly sealing a second pressure chamber, and
a pressure transfer path connecting the first pressure chamber with the second pressure chamber, wherein
the first and the second pressure chambers and the pressure transfer path are filled with a pressure transfer liquid, via which a pressure acting externally on the isolating diaphragm is transmitted to the transfer diaphragm.

The sensor module connected with the transfer module includes
a receiving body,
in which a pressure receiving chamber is enclosed, and which is connected pressure-tightly with the pressure transfer module in such a manner that the transfer diaphragm of the pressure transfer module outwardly seals the pressure receiving chamber,
a pressure sensor arranged in a pressure measuring chamber, and
a pressure transfer path connecting the pressure receiving chamber with the pressure measuring chamber, wherein
the pressure receiving chamber, the pressure measuring chamber and the pressure transfer path are filled with a second pressure transfer liquid, via which a pressure transmitted via the transfer diaphragm into the pressure receiving chamber is transmitted to the pressure sensor.

This solution offers the advantage that the transfer module can be filled with its pressure transfer liquid isolated from the sensor module, wherein the filling of the transfer module occurs according to DE 10 2004 052 950 A1 preferably at a filling temperature, which lies above a maximum use temperature, to which the isolating diaphragm can be exposed during operation. In such case, the filling according to DE 10 2004 052 950 A1 occurs preferably at an as low as possible filling pressure, which according to an especially preferred form of embodiment amounts to no more than 25 mbar. In this way, it is possible to use the transfer module at significantly higher temperatures than is the case for a pressure transfer means connected via its hydraulic path directly with the pressure measuring chamber containing the pressure sensor. Also in this case, however, the maximum use temperature for the isolating diaphragm is upwardly limited.

SUMMARY OF THE INVENTION

It is an object of the present invention to provide a pressure transfer module for transfer of pressures, especially pressures of less than or equal to 100 mbar, that can be applied, at yet higher temperatures.

For this, the invention resides in a pressure transfer module for transfer of pressures, especially pressures of less than or equal to 100 mbar, comprising
- an isolating diaphragm outwardly sealing a first pressure chamber and contactable externally with a pressure to be transmitted,
- a transfer diaphragm outwardly sealing a second pressure chamber, and
- a pressure transfer path connecting the first pressure chamber with the second pressure chamber, wherein
- the first and the second pressure chambers and the pressure transfer path are filled with a pressure transfer liquid, via which a pressure acting externally on the isolating diaphragm is transmitted to the transfer diaphragm, characterized in that
- the pressure transfer liquid is under a pre-pressure, especially a pre-pressure of greater than or equal to 30 mbar, especially greater than or equal to 50 mbar,
- the isolating diaphragm and the transfer diaphragm under the pre-pressure assume a starting position, from which they are deflected by the pressure to be transmitted, and
- the starting positions of isolating diaphragm and transfer diaphragm lie as a function of size of the pre-pressure and size of the pressure to be transmitted within deflection ranges of the diaphragms, in which deflections from their starting positions have due to their formation a non-axisymmetric part, especially an antisymmetric part.

A first further development is characterized in that the isolating diaphragm and the transfer diaphragm are of a metal material, especially stainless steel, tantalum or Monell, and have a material thickness in the order of magnitude of 30 μm to 200 μm.

A first variant is characterized in that
- the pre-pressure is greater than or equal to 30 mbar, and especially lies in the range from 30 mbar to 200 mbar,
- the isolating diaphragm and the transfer diaphragm have a deflectable region with a diameter of less than or equal to 90 mm, which lies especially in the range in the order of magnitude of 90 mm to 15 mm, wherein the diameter is smaller, the larger the pre-pressure is.

A second variant is characterized in that
- the pre-pressure is greater than or equal to 50 mbar, and
- the isolating diaphragm and the transfer diaphragm have a deflectable region with a diameter of less than or equal to 50 mm.

A second further development is characterized in that the pre-pressure is greater than a hydrostatic pressure exerted by the pressure transfer liquid in the pressure transfer module, wherein the pre-pressure is especially at least 10 mbar greater than a maximum hydrostatic pressure arising in the case of an orientation of a longitudinal axis of the pressure transfer module parallel to the force of gravity.

A preferred embodiment is characterized in that the isolating diaphragm and the transfer diaphragm are identical diaphragms.

A third further development is characterized in that the pressure transfer path extends through an elongated body, wherein the body especially has an outer diameter, which varies in the direction extending from the first pressure chamber to the second pressure chamber, especially such that its circumference varies periodically between a minimum circumference and a maximum circumference.

Another preferred embodiment is characterized in that the pressure transfer liquid is a liquid suitable for high temperature applications, especially a liquid preconditioned under vacuum, especially a polyolefin, a glycol ether, a halocarbon, a silicone oil or a poly(methyl phenyl siloxane).

A fourth further development is characterized in that
- the isolating diaphragm is composed of a corrosion resistant metal, especially tantalum, or
- a coating, especially a gold layer, a coating of a fluoropolymer, especially polytetrafluoroethylene, or a coating of tantalum, is provided on an outside of the isolating diaphragm.

A preferred embodiment is characterized in that the isolating diaphragm and the transfer diaphragm each have a contour with an a central, planar region, especially a central region with a diameter of no more than $2*a/3$, especially no more than $a/2$, wherein a is the radius of the deflectable region of the particular diaphragm, wherein the central, planar region is surrounded by a waved region with concentric wave regions, especially concentric wave regions, whose amplitude, first of all, lessens from the inside outwards, wherein then an outermost wave region adjoins, which returns to a greater amplitude.

A preferred embodiment of the latter embodiment is characterized in that
- the amplitude of the wave region adjoining the outermost wave region of isolating diaphragm and transfer diaphragm has, for instance, $1/3$ to $2/3$ the amplitude of the wave region following on the central region,
- the wave regions of a diaphragm have, apart from the outermost wave region, a maximum amplitude of no more than 4 times, especially no more than 3 times, especially no more than 2 times, the material thickness of the diaphragm, and/or
- the wave regions of a diaphragm have, apart from the outermost wave region, a wavelength, which varies from one wave region to the next wave region by no more than 20%, especially no more than 10%.

A fifth further development is characterized in that
- the pressure transfer module includes a first platform, in which the first pressure chamber outwardly sealed by the isolating diaphragm is enclosed,
- the platform is embodied in such a manner that it can be equipped with a process connection, especially a flange, and
- the process connection is embodied as a modular component, which is connectable with the pressure transfer module prefabricated without the process connection and already filled with pressure transfer liquid.

Additionally, the invention resides in a method for manufacturing a pressure transfer module of the invention, characterized in that
- the isolating diaphragm and transfer diaphragm are manufactured, wherein their formation is produced especially by embossing against a correspondingly formed stamp,
- the pre-embossed isolating diaphragm is connected pressure-tightly with a first platform enclosing the first pressure chamber and the pre-embossed transfer diaphragm is connected pressure-tightly with a second platform enclosing the second pressure chamber, and
- an interior of the pressure transfer module outwardly sealed by the isolating diaphragm and the transfer diaphragm is filled with the pressure transfer liquid.

A further development of this method is characterized in that the pre-pressure in the interior of the pressure transfer module is set by evacuating the interior before the filling, and introducing with a filling pressure into the interior, especially at room temperature, a volume of pressure transfer liquid corresponding to the pre-pressure to be set, wherein the introduced volume is sized as a function of the filling temperature in such a manner that the pre-pressure to be set reigns in the interior after sealing the interior.

Additionally, the invention resides in a pressure measuring transducer having a transfer module of the invention, characterized in that the pressure measuring transducer includes a sensor module, which has a receiving body, in which a pressure receiving chamber is enclosed, and which is connected pressure-tightly with the transfer module in such a manner that the transfer diaphragm of the pressure transfer module outwardly seals the pressure receiving chamber, which has a pressure sensor arranged in a pressure measuring chamber, which has a pressure transfer path connecting the pressure receiving chamber with the pressure measuring chamber, and the pressure receiving chamber, the pressure measuring chamber and the pressure transfer path are filled with a second pressure transfer liquid, via which a pressure transmitted via the transfer diaphragm into the pressure receiving chamber is transmitted to the pressure sensor.

BRIEF DESCRIPTION OF THE DRAWINGS

The invention and its advantages will now be explained in greater detail based on the figures of the drawing, in which an example of an embodiment is shown. Equal elements are provided in the figures with equal reference characters. The figures of the drawing show as follows.

DETAILED DISCUSSION IN CONJUNCTION WITH THE DRAWINGS

Figure 1:
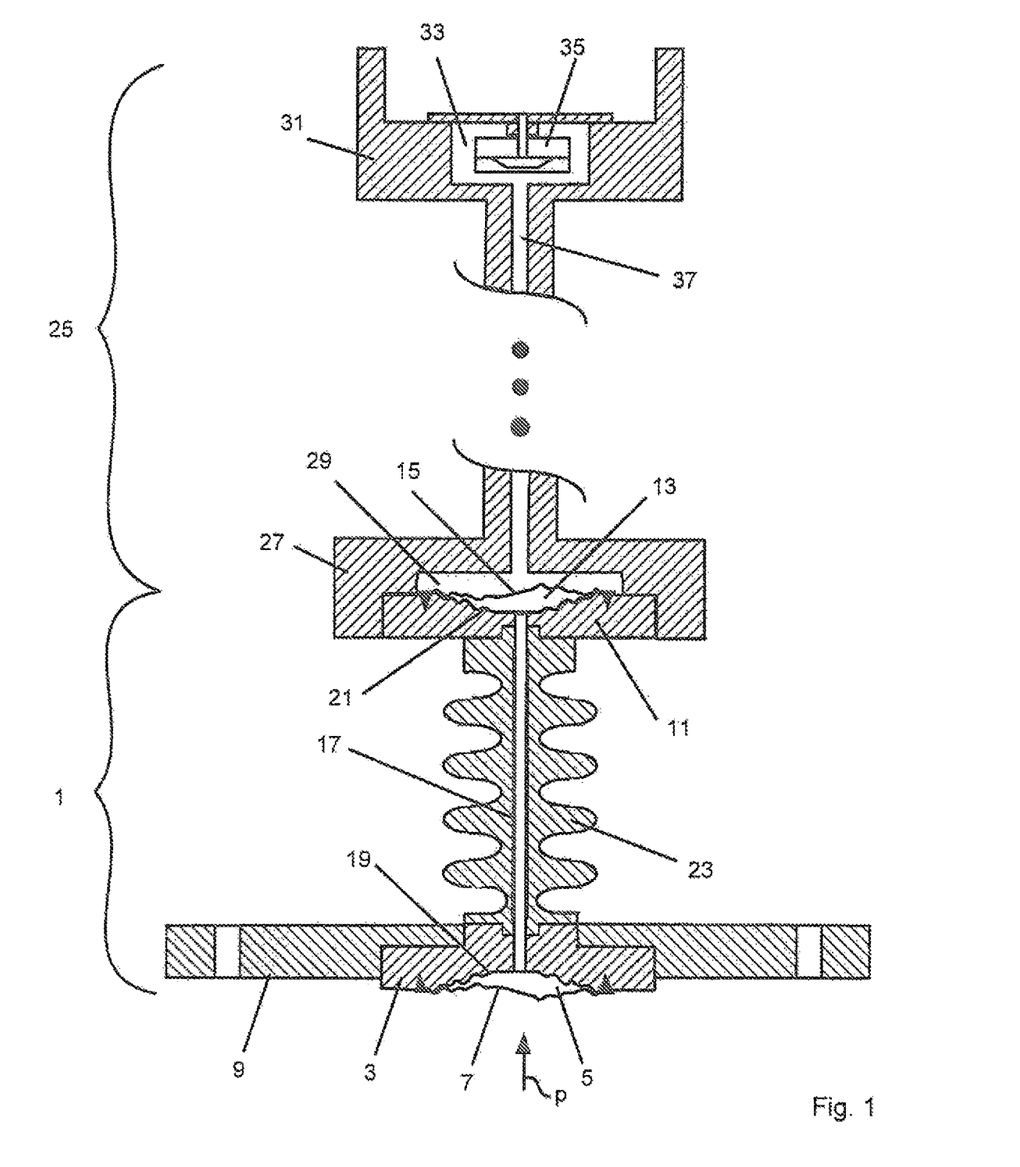
FIG. 1 is a pressure measuring transducer equipped with a pressure transfer module of the invention.

FIG. 1 shows a pressure measuring transducer, which is equipped with a pressure transfer module 1 of the invention for transfer of pressures p. Pressure transfer module 1 includes a first platform 3, in which a first pressure chamber 5 is enclosed, which is sealed outwardly by an isolating diaphragm 7. Platform 3 is preferably equipped, or connected, with a process connection 9, e.g. a flange, via which the platform 3 is mountable at a location of use. At the location of use, the isolating diaphragm 7 is supplied during operation externally with a medium, whose pressure p is to be transmitted with the pressure transfer module 1.

Pressure transfer module 1 includes at its end away from the isolating diaphragm 7 a second platform 11, in which a second pressure chamber 13 is enclosed, which is sealed outwardly by a transfer diaphragm 15. The first and the second pressure chambers 5, 13 are connected with one another via a pressure transfer path 17, preferably a capillary line. The first pressure chamber 5, the second pressure chamber 13 and the pressure transfer path 17 are filled with a pressure transfer liquid, via which a pressure p acting externally on the isolating diaphragm 7 is transmitted to the transfer diaphragm 15.

Isolating diaphragm 7 and transfer diaphragm 15 are connected pressure-tightly, e.g., such as shown here by triangles, welded, with their platforms 3, 11 along peripheral sealing surfaces of the platforms. The sealing surfaces border deflectable regions of the diaphragms, wherein in the first pressure chamber 5 under the isolating diaphragm 7 and in the second pressure chamber 13 under the transfer diaphragm 15, in each case, a volume V of pressure transfer liquid is enclosed as a function of the position of the relevant diaphragm.

In both pressure chambers 5, 13, there, is provided preferably, in each case, matched in its form to the form of the isolating diaphragm 7, or the transfer diaphragm 15, as the case may be, a diaphragm bed 19, 21, on which the particular diaphragm comes to rest in the case of an overload acting externally thereon.

In order to keep heat transfer from the isolating diaphragm 7 in the direction of the transfer diaphragm 15 as small as possible (because the isolating diaphragm 7 can, in given cases, be exposed to a very hot medium), the pressure transfer path 17 extends preferably through an elongated body 23, e.g. a metal body 23. Additionally, the body 23 has preferably an outer diameter, which varies in direction extending from the first pressure chamber 5 to the second pressure chamber 13, especially such that its circumference varies periodically between a minimum circumference and a maximum circumference. In this way, the body 23 as an enlarged external surface, via which it sheds heat by convection. This measure together with the elongation of the body 23 effects that less pressure transfer liquid is heated to less high temperatures via the isolating diaphragm 7. The transfer module 1 can, thus, be embodied shorter and compacter. In this way, the length of the pressure transfer path 17 is reduced, and therewith also the required amount of pressure transfer liquid.

The pressure transfer liquid is preferably one suitable for high temperature applications, preferably a liquid preconditioned under vacuum and as incompressible as possible with an as small as possible coefficient of thermal expansion. In such case, especially suited are liquids applied in vacuum technology, e.g. for vacuum pumps, such as, for example, polyolefins, glycol ethers, halocarbons, silicone oils or a poly(methyl phenyl siloxane). Alternatively, also other pressure transfer liquids suitable for this, such as e.g. special oils desired by a customer, can be applied.

According to the invention, the pressure transfer liquid is under a pre-pressure $p_v$. The pre-pressure $p_v$ refers to the pressure that the pressure transfer liquid is at in the interior of the pressure transfer module 1. It corresponds to the pressure, which reigns in the interior of the pressure transfer module 1 after the filling and sealing of the pressure transfer module 1. The pre-pressure $p_v$ can, depending on the type of filling method and the following sealing of the filled interior, differ quite significantly from a filling pressure, under which the pressure transfer liquid is introduced into the interior.

The pre-pressure $p_v$ acts counter to the vapor pressure of the pressure transfer liquid. In this way, an outgassing or evaporating of the pressure transfer liquid is, on the whole, reduced and starts only at significantly higher temperatures. The temperature range, in which the pressure transfer module 1 can be applied, is, thus, greater, the greater the pre-pressure $p_v$ is.

With the pressure transfer module 1 of the invention, even a pre-pressure $p_v$ of greater than or equal to 30 mbar produces a noticeable increase of the maximum use temperature, to which the isolating diaphragm 7 can be exposed during operation. In the case of a pre-pressure $p_v$ of greater than or equal to 50 mbar, even operating temperatures in the order of magnitude of up to 400° C. are attainable.

In such case, the pre-pressure $p_v$ is preferably clearly greater than a hydrostatic pressure exerted by the pressure transfer liquid in the pressure transfer module 1. Preferably, the pre-pressure $p_v$ is at least 10 mbar greater than the maximum hydrostatic pressure. The hydrostatic pressure depends on the installed position of the pressure transfer module 1 relative to the force of gravity. The maximum hydrostatic pressure occurs, when the longitudinal axis of the pressure transfer module 1 is oriented parallel to the force of gravity. In such installed position, the hydrostatic pressure depends on the distance between the isolating diaphragm 7 and the transfer diaphragm 15.

The pre-pressure $p_v$ causes a prestressing of the isolating diaphragm 7 and the transfer diaphragm 15. The pre-pressure $p_v$ acts on the inside of the isolating diaphragm 7 and the inside of the transfer diaphragm 15 and presses the two diaphragms outwardly. Correspondingly, the isolating diaphragm 7 and the transfer diaphragm 15, in the absence of an external pressure loading, assume, depending on size of the pre-pressure $p_v$, a starting position, from which they are then deflected by the pressure p to be transmitted as supplied during operation of the isolating diaphragm 7.

Axisymmetric diaphragms, such as e.g. those mentioned above and especially in DE 10 2005 023 021 A1 describe wave diaphragms with concentric waves and execute axisymmetric deflections from their starting position set via the filled volume of pressure transfer liquid. An axisymmetric deflection of a diaphragm refers to a deflection, in the case of which a deflection zs depends on a change $\Delta V$ of a volume V enclosed under the diaphragm, wherein $zs(r, \varphi, \Delta V):=z(r, \varphi, \Delta V)-z(r, \varphi, 0)$ of the z-coordinate of the individual points $(z, r, \varphi)$, is essentially independent of the spatial direction $\varphi$ in the plane extending perpendicular to the z-axis, wherein r is the distance to the z-axis and $\varphi$ is the spatial direction.

Diaphragms, which due to their formation execute exclusively axisymmetric deflections, have, as a rule, an instable starting position. Correspondingly, even a small deflection of an axisymmetric diaphragm from its starting position leads to the diaphragm trying to reach its next energetically more favorable position. This makes the diaphragm stiffer and a pressure falling across the diaphragm and corrupting the pressure transfer arises. If one would outwardly deflect an axisymmetric diaphragm by a pre-pressure acting from the inside thereon, this disadvantageous effect would occur already in the starting position effected by the pre-pressure. That would lead to a permanent increasing of the diaphragm stiffness and a worsening of the pressure transfer characteristics.

In order, in spite of the prestress of isolating diaphragm 7 and the transfer diaphragm 15 effected on the pre-pressure $p_v$, to assure an as uncorrupted as possible pressure transfer, applied in the pressure transfer module 1 of the invention as isolating diaphragm 7 and as transfer diaphragm 15 are diaphragms, whose deflections from their starting positions set via the pre-pressure $p_v$ have a non-axisymmetric part.

For this, isolating diaphragm 7 and transfer diaphragm 15 are preferably embodied in such a manner that their deflection from the starting position, which is dependent on the pre-pressure $p_v$, is an essentially axisymmetric deflection, on which is superimposed a non-axisymmetric deflection.

The non-axisymmetric part of the deflections of isolating diaphragm 7 and transfer diaphragm 15 from, the starting position dependent on the pre-pressure $p_v$ is preferably an antisymmetric part. In that case, there holds for the deflection zas of the z-coordinates of the individual points $(z, r, \varphi)$ of the isolating diaphragm 7 and the transfer diaphragm 15 from their pre-pressure $p_v$ dependent, starting positions caused by a change $\Delta V$ of the volume V enclosed under their diaphragms, as effected by the antisymmetric part: $zas(r, \varphi, \Delta V) \cong -zas(r, \varphi+180°, \Delta V)$, wherein the value for $zas(r, \varphi, \Delta V)$ equals the difference:

$$zas(r,\varphi,\Delta V):=z(r,\varphi,\Delta V)-zs(r,\varphi,\Delta V)$$

between the actual z-coordinate $z(r, \varphi, \Delta V)$ of a point of the particular diaphragm and the z-coordinate $zs(r, \varphi, \Delta V)$ of the point effected by the axisymmetric part of the deflection. In such case, the function $zs(r, \varphi, \Delta V)$ can, for example, be so selected that the integral of the square of $zas(r, \varphi, \Delta V)$ over the deflectable region of the particular diaphragm has a minimum and especially assumes the value zero.

Used to this end as isolating diaphragm 7 and as transfer diaphragm 15 are, preferably, isolating diaphragms described in German Patent, DE 10 2008 033 337 A1. These isolating diaphragms have an embossed contour, which is embodied in such a manner that deflections of the isolating diaphragm starting from a starting position referenced in DE 10 2008 033 337 A1 as a reference position have a non-axisymmetric part. Via the non-axisymmetric part of the deflections of the isolating diaphragms described in DE 10 2008 033 337 A1, it is achieved that these diaphragms assume states of energetically almost equal value over a comparatively large range of deflections. In contrast with diaphragms of purely axisymmetric deflection, in the case of which stiffness of the diaphragm drastically rises with increasing deflection, these diaphragms have, over a comparatively large range of deflections, a significantly smaller stiffness, which rises with increasing deflection significantly less strongly. Due to the large deflection range, in which the deflections of these isolating diaphragms have a non-axisymmetric part, it is possible within certain limits to shift the reference position, from which this isolating diaphragm is deflected during operation.

In the pressure transfer module 1 of the invention, these isolating diaphragms are applied as isolating diaphragm 7 and as transfer diaphragm 15, wherein they are designed for this in such a manner that their reference positions correspond to their starting positions effected by the pre-pressure $p_v$, and the deflections of isolating diaphragm 7 and transfer diaphragm 15 to both sides of this starting position dependent on the pressure p to be transmitted within the pressure range of the pressures p to be transmitted have a non-axisymmetric part, especially an antisymmetric part. Isolating diaphragm 7 and transfer diaphragm 15 are thus operated in deflection ranges of the two diaphragms, in which their deflections from their starting positions effected by the pre-pressure $p_v$ have due to their formation a non-axisymmetric part, especially an antisymmetric part.

Isolating diaphragm 7 and transfer diaphragm 15 are preferably embodied in such a manner that the non-axisymmetric part of the deflection of isolating diaphragm 7 and transfer diaphragm 15 achieves its maximum size when isolating diaphragm 7 and transfer diaphragm 15 are located in their starting positions dependent on the pre-pressure $p_v$. The maximum deflection of the non-axisymmetric deflection mode can be, for example, 2 to 5 times the material thickness h of isolating diaphragm 7 and transfer diaphragm 15.

Starting from their starting positions dependent on the pre-pressure $p_v$, the non-axisymmetric part of the deflections of isolating diaphragm 7 and transfer diaphragm 15 decreases with increasing deflection of the diaphragms from their starting positions dependent on the pre-pressure $p_v$.

Figure 2:
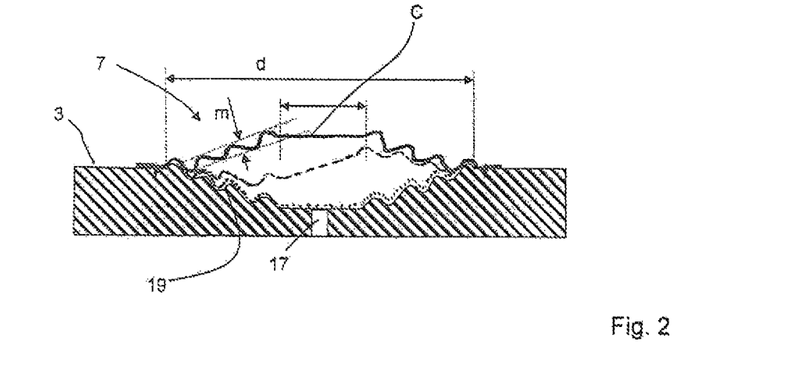
FIG. 2 is the isolating diaphragm of the pressure transfer module of FIG. 1.

Isolating diaphragm 7 and transfer diaphragm 15 have, for example, the formation described in German Patent, DE 10 2012 110 771 A1 and shown here in FIG. 2 using the example of the isolating diaphragm 7 welded to the first platform 3. In such case, the contour of the isolating diaphragm 7 has a central, planar region C, which is surrounded by a waved region m with preferably concentric wave regions. The central region C has preferably a diameter of no more than $2*a/3$, especially preferably no more than $a/2$, wherein a is the radius of the deflectable region of the isolating diaphragm 7. The amplitude of the waves of the waved region need not be constant. The amplitude of the waves can, such as shown in FIG. 2, first of all, lessen from the inside outwards, wherein then an outermost wave region adjoins, which can again have a greater amplitude. The amplitude of the outermost wave region can have, for example, for instance, an amplitude of about ⅓ to ⅔ the amplitude of the wave region following the central region. The wave regions have, apart from the outermost wave region, for example, a maximum amplitude of no more than 4 times, preferably no more than 3 times, and further preferably no more than 2 times, the material thickness h of the isolating diaphragm 7. The wave regions have, apart from the outermost wave region, preferably wavelengths, which vary from wave region to wave region by no more than 20%, preferably no more than 10%.

Preferably, material thickness h and diameter d of the deflectable region of the isolating diaphragm 7 and the transfer diaphragm 15 are matched to the size of the pre-pressure $p_v$ taking into consideration their formation. In such case, isolating diaphragm 7 and transfer diaphragm 15 have preferably, in each case, a material thickness h, which is greater, the greater the pre-pressure $p_v$ is. Additionally, isolating diaphragm 7 and transfer diaphragm 15 have preferably, in each case, a diameter d, which is less, the greater the pre-pressure $p_v$ is. In such case, for preventing or reducing outgassing of the pressure transfer liquid at high temperatures, advantageously, the pre-pressure $p_v$ is as large as possible.

A technically sensibly realizable upper limit for the pre-pressure $p_v$ under today's conditions would be in the order of magnitude of, for instance, 200 mbar.

Isolating diaphragm 7 and transfer diaphragm 15 are preferably of a metal material, such as e.g. stainless steel, tantalum or Monell. Metal isolating diaphragms 7 and transfer diaphragms 15 have a material thickness h predetermined as a function of their formation and the pre-pressure $p_v$, which preferably lies in the range from 30 μm to 200 μm.

There are applications, in the case of which the outside of the isolating diaphragm 7 to be loaded with the pressure p to be measured can, in given cases, be exposed to media, which attack the isolating diaphragm 7. In that case, the isolating diaphragm 7 is composed preferably of a metal, e.g. corrosion resistant tantalum, resistant to the medium. Alternatively, the outside of the isolating diaphragm 7 can be provided with a coating resistant to the medium. The coating can be e.g. a gold layer, which can be applied e.g. galvanically on the outside. Alternatively, a coating of a fluoropolymer, e.g. polytetrafluoroethylene, can be applied on the outside of the isolating diaphragm 15. An alternative is a coating of tantalum, which can be applied e.g. on an isolating diaphragm 7 of a steel or stainless steel. Such coatings are described in the German patent application of the applicant, No. 10 2014 103142.3, filed Mar. 10, 2014.

In such case, the stiffness of isolating diaphragm 7 and transfer diaphragm 15 is smaller, the larger their diameter d is. An increasing of the diameter d of isolating diaphragm 7 and transfer diaphragm 15 enlarges the volumes of pressure transfer liquid enclosed under the diaphragms. The pressure transfer liquid has, as a matter of course, a coefficient of thermal expansion different from the materials surrounding it, e.g. stainless steel. There is, thus, an optimum diameter d, in the case of which for an as high as possible pre-pressure $p_v$, an as low as possible stiffness and an as small as possible volume of pressure transfer liquid can be achieved.

In the case of pre-pressures $p_v$ in the range from 30 mbar to 200 mbar, isolating diaphragm 7 and transfer diaphragm 15 have, preferably, in each case, a diameter d of less than or equal to 90 mm. In the aforementioned pre-pressure range, the diameters d lie preferably in a range in the order of magnitude of 90 mm to 15 mm, wherein the diameter d is smaller, the larger the pre-pressure $p_v$ is. In the case of pre-pressures $p_v$ of greater than or equal to 50 mbar, isolating diaphragm 7 and transfer diaphragm 15 have, preferably, in each case, a diameter d of less than or equal to 50 mm.

Asymmetry required for achieving a non-axisymmetric fraction of the deflection of isolating diaphragm 5 and transfer diaphragm 13 is preferably produced in the manner described in German Patent, DE 10 2008 033 337 A1 by a corresponding forming or embossing of the contours of the diaphragms. In this connection, the pre-embossed isolating diaphragm 7 and the pre-embossed transfer diaphragm 15 are pressure-tightly connected, e.g. welded, to their platforms 3, 11.

Since the designs of the isolating diaphragm 7 and the transfer diaphragm 15 are, in each case, for the same pre-pressure $p_v$ and the same pressure range of pressures p to be transmitted, the two diaphragms are preferably identical. In that case, naturally also the first and second pressure chambers 5, 13 are preferably of equal construction.

The pre-pressure $p_v$ in the interior of the pressure transfer module 1 is preferably set in the course of its filling. For this, the pressure transfer module 1 includes, communicating with its interior to be filled, a filling duct (not shown in FIG. 1), via which the pressure transfer liquid is introduced. Filling methods, embodiments of the filling duct and its closure are known to those skilled in the art, so that only special features of the transfer module 1 of the invention will be explained in greater detail below.

Before the filling, the interior is evacuated. Then, a volume of pressure transfer liquid corresponding to the pre-pressure $p_v$ to be set is introduced into the interior with a filling pressure. The filling pressure corresponds to the pressure, with which the pressure transfer liquid is charged into the interior. The filling pressure must be distinguished from the pre-pressure $p_v$, which reigns in the interior at the end of the filling after the sealing of the interior. The filling can occur at room temperature. In such case, the introduced volume is to be dimensioned as a function of the filling temperature in such a manner that the pre-pressure $p_v$ to be set reigns in the interior after the sealing of the interior.

Due to the pre-pressure $p_v$, isolating diaphragm 7 and transfer diaphragm 15 are permanently prestressed. In such case, they assume starting positions, in which they have the non-axisymmetric formation.

In the case of the example of application illustrated in FIG. 1 for a transfer module 1 of the invention, the transfer module 1 in the illustrated pressure measuring transducer is placed in front of a sensor module 25.

Sensor module 25 includes a receiving body 27, in which a pressure receiving chamber 29 is enclosed. The receiving body 27 is, pressure-tightly connected, e.g. welded, with the transfer module 1 in such a manner that the transfer diaphragm 15 of the pressure transfer module 1 outwardly seals the pressure receiving chamber 29 of the sensor module 25.

Sensor module 25 includes, enclosed in a housing 31, a pressure measuring chamber 33, in which a pressure sensor 35 is arranged. Pressure measuring chamber 33 and pressure receiving chamber 29 are connected with one another via a pressure transfer path 37, preferably a capillary line. Pressure receiving chamber 29, pressure measuring chamber 33 and pressure transfer path 37 are filled with a second pressure transfer liquid, via which a pressure transmitted via the transfer diaphragm 15 into the pressure receiving chamber 29 is transmitted to the pressure sensor 35.

Due to the transfer module 1 connected in front, sensor module 25, even in the case of applications, in which the isolating diaphragm 7 is exposed to very high operating temperatures, especially temperatures up to 400° C., is exposed to only a significantly lower temperature. This, offers the advantage that the sensor module 25 can be filled with a significantly more cost favorable pressure transfer liquid. In such case, the modular construction of the pressure measuring transducer offers the advantage that the pressure transfer modules 1 can e.g. be centrally prefabricated and connected at other locations with decentrally manufactured sensor modules 25, which then can be filled with the second transfer liquid, without requiring for this, the special apparatuses and special knowledge required for manufacture and filling of the transfer module 1.

Figure 3:
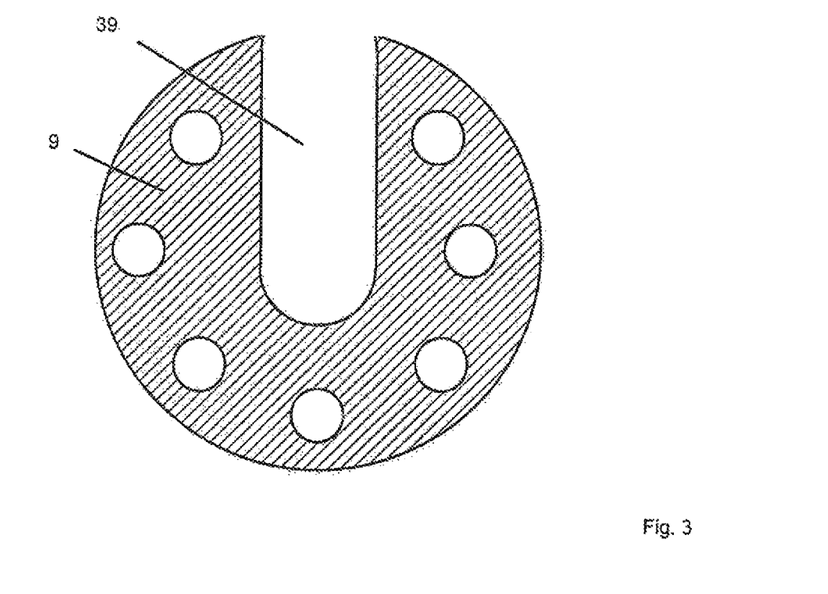
FIG. 3 is a plan view onto the process connection of FIG. 1.

Preferably, the process connection 9 of the pressure transfer module 1 is embodied as a modular component. This offers the advantage that the pressure transfer modules 1, can first of all, be prefabricated and filled centrally without a process connection 9, and decentrally equipped with the process connection 9 required, for the particular application. For this, the process connection 9 can be connected subsequently, e.g. by welding with the platform 3 of the pressure transfer module 1. For this, the process connection 9 can be embodied e.g. as an essentially washer shaped flange, which has a slot 39 in the plan view illustrated in FIG. 3 leading from the center to the edge, which enables the flange subsequently to be placed over the platform 3 of the prefabricated pressure transfer module 1 and welded there. Alternatively, naturally also other modular embodiments can be applied.

The invention is also applicable completely analogously in pressure-difference measuring transducers, which are then equipped correspondingly with two pressure transfer modules 1 of the invention, each of which transmits one of the two pressures, whose difference is to be measured, to a sensor module equipped with a pressure difference sensor having two pressure receipt chambers.

The invention claimed is:

1. A pressure transfer module for transfer of pressures of less than or equal to 100 mbar, comprising:
an isolating diaphragm outwardly sealing a first pressure chamber and contactable externally with a pressure to be transmitted;
a transfer diaphragm outwardly sealing a second pressure chamber; and
a pressure transfer path connecting said first pressure chamber with said second pressure chamber, wherein:
said first and said second pressure chambers and said pressure transfer path are filled with a pressure transfer liquid, via which a pressure acting externally on said isolating diaphragm is transmitted to said transfer diaphragm;
the pressure transfer liquid is under a pre-pressure;
said isolating diaphragm and said transfer diaphragm under the pre-pressure assume a starting position, from which they are deflected by the pressure to be transmitted; and
the starting positions of said isolating diaphragm and said transfer diaphragm lie as a function of size of the pre-pressure and size of the pressure to be transmitted within deflection ranges of the diaphragms, in which deflections from their starting positions have due to their forming an antisymmetric part.

2. The pressure transfer module as claimed in claim 1, wherein:
said isolating diaphragm and said transfer diaphragm are of a stainless steel metal material, tantalum or Monell, and have a material thickness in the order of magnitude of 30 µm to 200 µm.

3. The pressure transfer module as claimed in claim 1, wherein:
said pre-pressure is greater than or equal to 30 mbar;
said isolating diaphragm and said transfer diaphragm have a deflectable region with a diameter of less than or equal to 90 mm, which lies especially in the range in the order of magnitude of 90 mm to 15 mm; and
the diameter is smaller, the larger the pre-pressure is.

4. The pressure transfer module as claimed in claim 1, wherein:
said pre-pressure is greater than or equal to 50 mbar; and
said isolating diaphragm and said transfer diaphragm have a deflectable region with a diameter of less than or equal to 50 mm.

5. The pressure transfer module as claimed in claim 1, wherein:
said pre-pressure is greater than a hydrostatic pressure exerted by the pressure transfer liquid in the pressure transfer module.

6. The pressure transfer module as claimed in claim 1, wherein:
said isolating diaphragm and said transfer diaphragm are identical diaphragms.

7. The pressure transfer module as claimed in claim 1, wherein:
the pressure transfer path extends through an elongated body; and
said body has an outer diameter, which varies in the direction extending from said first pressure chamber to said second pressure chamber, such that its circumference varies periodically between a minimum circumference and a maximum circumference.

8. The pressure transfer module as claimed in claim 1, wherein:
said pressure transfer liquid is a liquid suitable for high temperature applications and is a liquid preconditioned under vacuum.

9. The pressure transfer module as claimed in claim 1, wherein:
said isolating diaphragm is composed of a corrosion resistant metal; or
a gold layer coating, a polytetrafluoroethylene fluoropolymer coating, or a coating of tantalum, is provided on an outside of said isolating diaphragm.

10. The pressure transfer module as claimed in claim 1, wherein:
said isolating diaphragm and said transfer diaphragm each have a contour with an a central, planar region, wherein the central, planar region is surrounded by a waved region (m) with concentric wave regions.

11. The pressure transfer module as claimed in claim 10, wherein:
the amplitude of the wave region adjoining the outermost wave region of said isolating diaphragm and said transfer diaphragm has, for instance, ⅓ to ⅔ the amplitude of the wave region following on the central region;
the wave regions of a diaphragm have, apart from the outermost wave region, a maximum amplitude of no more than 4 times the material thickness (h) of the diaphragm; and/or
the wave regions of a diaphragm have, apart from the outermost wave region, a wavelength, which varies from one wave region to the next wave region by no more than 20%.

12. The pressure transfer module as claimed in claim 1, wherein:
the pressure transfer module includes a first platform, in which said first pressure chamber outwardly sealed by said isolating diaphragm is enclosed;
said platform is embodied in such a manner that it can be equipped with a process connection, especially a flange; and
said process connection is embodied as a modular component, which is connectable with the pressure transfer module prefabricated without said process connection and filled with pressure transfer liquid.

13. A method for manufacturing a pressure transfer module, comprising:
a pressure transfer module for transfer of pressures of less than or equal to 100 mbar, comprising: an isolating diaphragm outwardly sealing a first pressure chamber and contactable externally with a pressure to be transmitted; a transfer diaphragm outwardly sealing a second pressure chamber; and a pressure transfer path connecting said first pressure chamber with said second pressure chamber, wherein: said first and said second pressure chambers and said pressure transfer path are filled with a pressure transfer liquid, via which a pressure acting externally on said isolating diaphragm is transmitted to said transfer diaphragm; the pressure transfer liquid is under a pre-pressure; said isolating diaphragm and said transfer diaphragm under the pre-pressure assume a starting position, from which they are deflected by the pressure to be transmitted; and the starting positions of said isolating diaphragm and said transfer diaphragm lie as a function of size of the pre-pressure and size of the pressure to be transmitted within deflection ranges of the diaphragms, in which deflections from their starting positions have due to their forming an antisymmetric part, the method comprising:
manufacturing the isolating diaphragm and transfer diaphragm, wherein their forming is produced by embossing against a correspondingly formed stamp;
connecting the pre-embossed isolating diaphragm pressure-tightly with a first platform enclosing the first pressure chamber and the pre-embossed transfer diaphragm is connected pressure-tightly with a second platform enclosing the second pressure chamber; and
outwardly sealing an interior of the pressure transfer module by the isolating diaphragm and the transfer diaphragm is filled with the pressure transfer liquid.

14. The method as claimed in claim 13, wherein:
the pre-pressure in the interior of the pressure transfer module is set by evacuating the interior before the filling;
introducing with a filling pressure into the interior, especially at room temperature, a volume of pressure transfer liquid corresponding to the pre-pressure to be set; and
the introduced volume is sized as a function of the filling temperature in such a manner that the pre-pressure to be set reigns in the interior after sealing the interior.

15. A pressure measuring transducer having a transfer module, comprising:
a pressure transfer module for transfer of pressures of less than or equal to 100 mbar, comprising: an isolating diaphragm outwardly sealing a first pressure chamber and contactable externally with a pressure to be transmitted; a transfer diaphragm outwardly sealing a second pressure chamber; and a pressure transfer path connecting said first pressure chamber with said second pressure chamber, wherein: said first and said second pressure chambers and said pressure transfer path are filled with a pressure transfer liquid, via which a pressure acting externally on said isolating diaphragm is transmitted to said transfer diaphragm; the pressure transfer liquid is under a pre-pressure; said isolating diaphragm and said transfer diaphragm under the pre-pressure assume a starting position, from which they are deflected by the pressure to be transmitted; and the starting positions of said isolating diaphragm and said transfer diaphragm lie as a function of size of the pre-pressure and size of the pressure to be transmitted within deflection ranges of the diaphragms, in which deflections from their starting positions have due to their forming an antisymmetric part, wherein:
the pressure measuring transducer includes a sensor module, which has a receiving body, in which a pressure receiving chamber is enclosed, and
which is connected pressure-tightly with the transfer module in such a manner that the transfer diaphragm of the pressure transfer module outwardly seals the pressure receiving chamber,
which has a pressure sensor arranged in a pressure measuring chamber;
which has a pressure transfer path connecting the pressure receiving chamber with the pressure measuring chamber; and
its pressure receiving chamber, the pressure measuring chamber and the pressure transfer path are filled with a second pressure transfer liquid, via which a pressure transmitted via the transfer diaphragm into the pressure receiving chamber is transmitted to the pressure sensor.

16. The pressure transfer module as claimed in claim 5, wherein said pre-pressure is at least 10 mbar greater than a maximum hydrostatic pressure arising in the case of an orientation of a longitudinal axis of the pressure transfer module parallel to the force of gravity; and/or said pressure transfer liquid is a polyolefin, a glycol ether, a halocarbon, a silicone oil or a poly(methyl phenylsiloxane; and/or said isolating diaphragm is composed of tantalum.

17. The pressure transfer module as claimed in claim 8, wherein said pre-pressure is at least 10 mbar greater than a maximum hydrostatic pressure arising in the case of an orientation of a longitudinal axis of the pressure transfer module parallel to the force of gravity; and/or said pressure transfer liquid is a polyolefin, a glycol ether, a halocarbon, a silicone oil or a poly(methyl phenylsiloxane; and/or said isolating diaphragm is composed of tantalum.

18. The pressure transfer module as claimed in claim 9, wherein said pre-pressure is at least 10 mbar greater than a maximum hydrostatic pressure arising in the case of an orientation of a longitudinal axis of the pressure transfer module parallel to the force of gravity; and/or said pressure transfer liquid is a polyolefin, a glycol ether, a halocarbon, a silicone oil or a poly(methyl phenylsiloxane; and/or said isolating diaphragm is composed of tantalum.

19. The pressure transfer module as claimed in claim 10, wherein:
    said central region of said respective isolating diaphragm or said transfer diaphragm has a diameter of no more than 2*a/3, wherein a is the radius of the deflectable region of the respective isolating diaphragm or said transfer diaphragm; and
    said concentric wave regions, whose amplitude, first of all, lessens from the inside outwards, wherein then an outermost wave region adjoins, which returns to a greater amplitude.

* * * * *